United States Patent [19]

Blaisdell et al.

[11] Patent Number: 5,676,088
[45] Date of Patent: Oct. 14, 1997

[54] MOLDED BOAT HULL WITH INTEGRALLY CONTAINED AREAS OF LOCALIZED REINFORCEMENT

[75] Inventors: George Blaisdell, New Bern; Dennis Kovach, Cary, both of N.C.

[73] Assignee: Allied Logic Corporation, Durham, N.C.

[21] Appl. No.: 595,291

[22] Filed: Feb. 1, 1996

[51] Int. Cl.⁶ ........................................................ B63B 5/24
[52] U.S. Cl. ........................................ 114/357; 114/343
[58] Field of Search .............................. 114/357, 267, 114/61, 65 A, 343, 347, 266, 39.1; 441/65, 79; 411/427

[56] References Cited

U.S. PATENT DOCUMENTS

| | | |
|---|---|---|
| 1,018,488 | 2/1912 | Gorsuch .................. 114/65 A |
| 2,632,355 | 3/1953 | Becker ..................... 411/427 |
| 2,772,560 | 12/1956 | Neptune ................... 411/427 |
| 3,073,271 | 1/1963 | Brill ........................ 114/266 |
| 3,796,175 | 3/1974 | Ford, Jr. .................. 114/39.1 |
| 3,840,926 | 10/1974 | Stoeberl .................. 114/357 |
| 4,041,716 | 8/1977 | Thompson ................ 114/266 |
| 4,365,577 | 12/1982 | Heinrich .................. 114/267 |

*Primary Examiner*—Sherman Basinger
*Attorney, Agent, or Firm*—Abelman, Frayne & Schwab

[57] ABSTRACT

An integrally moulded plastic boat hull structure is provided with a plurality of threaded inserts for securing associated boat components. Each of the threaded inserts is moulded into the boat hull structure with a force dissipating planar member which directs the localized forces away from the threaded insert to an enlarged boat hull region proximate the threaded insert. By spreading the load over a greater region, a highly localized load point is avoided.

14 Claims, 4 Drawing Sheets

MOLDED BOAT HULL WITH INTEGRALLY CONTAINED AREAS OF LOCALIZED REINFORCEMENT

FIELD OF THE INVENTION

This invention relates to a reinforced integrally molded plastic boat hull structure of the type shown in U.S. Pat. No. 5,458,844, which is formed of peripherally joined inner and outer shells with a plurality of longitudinally extending stiffening members between the inner and outer shells. In accordance with the present invention, regions of localized reinforcement are integrally molded into the hull to strengthen the hull at high load points and distribute the load. This significantly reduces the concentration of forces which might otherwise lead to hull damage. More specifically, the present application is directed to the addition of a reinforcement at the locations of the bow having threaded inserts for attachment to the bow or stem eyes, cleats or other members, which would tend to create regions of high localized forces.

DESCRIPTION OF THE PRIOR ART

The materials of construction for a boat hull require the combination of formability, strength, attractive appearance, low maintenance and durability in the marine environment. For a very substantial period of time boat hulls of varying sizes have been constructed of wood. However, such boat hulls disadvantageously require substantial maintenance and are subject to deterioration. In addition wooden hulls require substantial labor costs for construction and use of increasingly costly wood materials.

More recently boat hulls have been increasingly constructed of fiberglass. Fiberglass materials can be formed into the shape of boat hulls and the resulting boat hull structure is sufficiently strong for boat hulls and advantageously has greater resistance to deterioration in the marine environment as compared to wooden boats. Hence, fiberglass boat hulls have become an increasingly popular material for boat construction.

There are, however, a number of problems with fiberglass as a material for boat construction. These problems include:

Manufacturing with fiberglass materials can be environmentally problematic. The release of volatile organic compounds that are distressing in both the manufacturing facilities and the immediate environs. The volatile organic compounds used in fiberglass manufacture are hazardous materials and can also be destructive to ozone in the atmosphere.

Both manufacturing waste and non-serviceable fiberglass products cannot be recycled and do not readily deteriorate in landfills. Management of fiberglass wastes is faced with increasing costs and limitation.

Fiberglass boat hulls, particularly in larger boat sizes, require internal reinforcement between the outer hull and the mechanically affixed deck. Such supports are generally provided by spaced vertical members, or "stringers", which are mechanically connected at their opposed edges to the internal surfaces of the hull and deck. As the boat hull is subjected to the stresses of its movement through water and wave, both tension and compression forces act on the outer hull and thus act conversely on the opposed edge of the stringers where they interface with the underside of the deck. This results in significant sheer forces within the stringer and at the interfaces of the stringers with the outer hull or deck. This can cause the rupture of the interconnection of the stringer to the associated hull and deck, resulting in serious damage to the boat hull structure, making it non-serviceable.

It has been suggested that the boat hull be moulded as a hollow plastic shell with an integral foam plastic reinforcement between the inner surfaces of the shell. The use of foam plastic material to provide increased strength between the inner surfaces of a shell is primarily of practical use for smaller size hulls because as the boat size increases the distance between the two shells to be filled with foam also increases. When such a boat hull is impacted, the compressional and tension sheer forces will be experienced in the foam which, similar to the stringers in the fiberglass boat, results in deleterious rupture within the foam and the loss of its required strengthening effect.

Although boats of plastic resins such as polyethylene have many desirable characteristics, prior to U.S. Pat. No. 5,458,844 it has not been feasible to commercially produce water craft of plastic material in all the most popular recreational types and sizes. Such boats include an integrally molded shell with a series of spaced longitudinal stiffening members extending between the bow and stem. Hence, by overcoming the prior structural limitations to produce boats of substantial size from plastic, the method and structure disclosed in aforementioned U.S. Pat. No. 5,458,844 has provided dramatic end benefits to consumers including: Such boats are significantly more efficient and maintenance free since the surface characteristics of the plastic are such that sea life will not grow thereon, thereby maintaining a slippery hull. As a consequence, the craft is not only significantly more fuel efficient over the course of use, as well, there is no need for expensive anti-fouling paints finishes. Indeed, since the color is integral throughout the thickness of the plastic, there is no need for a covering paint, thereby avoiding deleterious blistering or cracking. Further, scratches and other abrasions can be buffed away or are less visually disconcerting.

SUMMARY OF THE INVENTION

Such boat hulls include several locations of high localized forces where connections are made to the hull. They typically exist at the connection to the bow or stem eyes, and cleat locations. Areas surrounding the connection of these members to the moulded boat hull will tend to be subjected to such high localized forces. In accordance with the present invention, such regions of highly localized forces are strengthened, while the forces are distributed over an increased area. Hence, by dissipating such forces into regions of the boat hull displaced from their immediate origination an improved product results, which is less prone to stress deterioration.

In accordance with the present invention, a planar force distribution member is interposed between a threaded insert molded into the shell and the surrounding shell region. This force distribution member may be a steel or other metallic sheet, preferably of mesh configuration. In forming the boat hull, the threaded insert is first secured to the planar reinforcing member. This assembly is their attached to one of the moulds at the desired location. The plastic material forming the boat hull is then introduced into the mould, and as the hull is rotationally moulded in the manner discussed in aforementioned U.S. Pat. No. 5,458,844, (whose disclosure is incorporated herein by reference), the threaded insert/planar reinforcing member assembly will be retained in place and integrally moulded into the hull. The access to the threaded insert will be at the hull location where it is desired to connect an associated boat element, such as the bow or stern eyes. The utilization of mesh advantageously facilitates the flow of the plastic about the mesh surfaces, so as to secureably integrate the threaded insert/mesh assembly into the moulded boat hull. To facilitate such integral securement, the coefficient of expansion of the plastic material forming the boat hull should be greater than the mesh.

Accordingly, it is a primary object of the present invention to significantly reduce the localized forces present at individual regions of a moulded boat hull structure which tend to have high stress points.

A further object of the present invention is to provide a moulded boat shell structure in which threaded inserts are integrally moulded into the boat hull, with the threaded insert extending through a planar force distribution member which is integrally moulded into the boat hull at such regions of increase localized forces.

Another object of the present invention is to provide for such reinforcement of the threaded inserts, in which the force distribution member is in the form of open mesh steel.

Yet another object of the present invention is to provide a plurality of anchoring points along a moulded boat hull structure, each of which comprises a threaded insert, surrounded by a planar force distribution member moulded into, and beneath the surfaces of, the boat hull.

These as well as other of the present invention will become apparent upon consideration of the following description and drawings.

DETAILED DESCRIPTION

Figure 1:
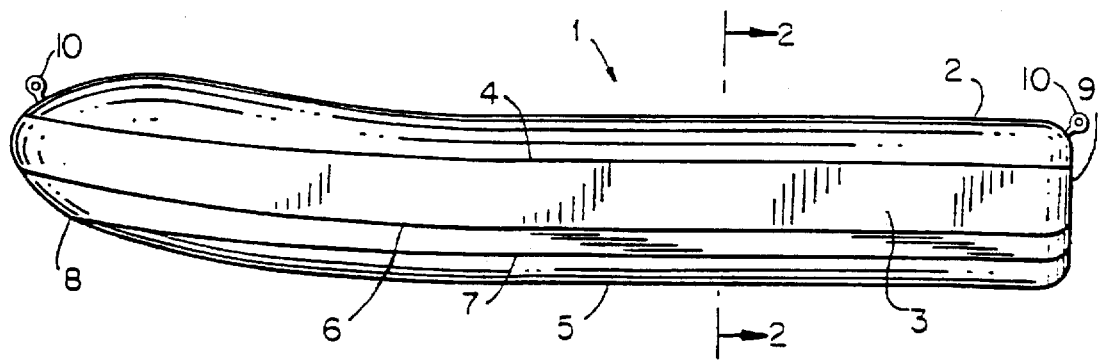
FIG. 1 is a side view of an integrally moulded plastic boat hull structure, showing the location of typed regions adapted for the reception of the reinforcement structure of the present invention.

With respect to FIG. 1 of the drawings there is provided an integrally moulded plastic boat hull generally indicated by arrow 1. As is the subject of aforementioned U.S. Pat. No. 5,458,844, the hull 1 is formed from a moldable plastic material and comprises an inner, or deck, shell 2 and an outer, or hull, shell 3. The inner shell 2 is joined to the outer shell 3 along a joint line 4. The outer shell 3 comprises a keel 5 and outboard planing strake or chine 6 and planing strake 7 disposed between the keel 5 and joint line 4 and extending longitudinally from the region of the bow 8 to the transom region at the stern 9 of the hull 1.

Figure 2:
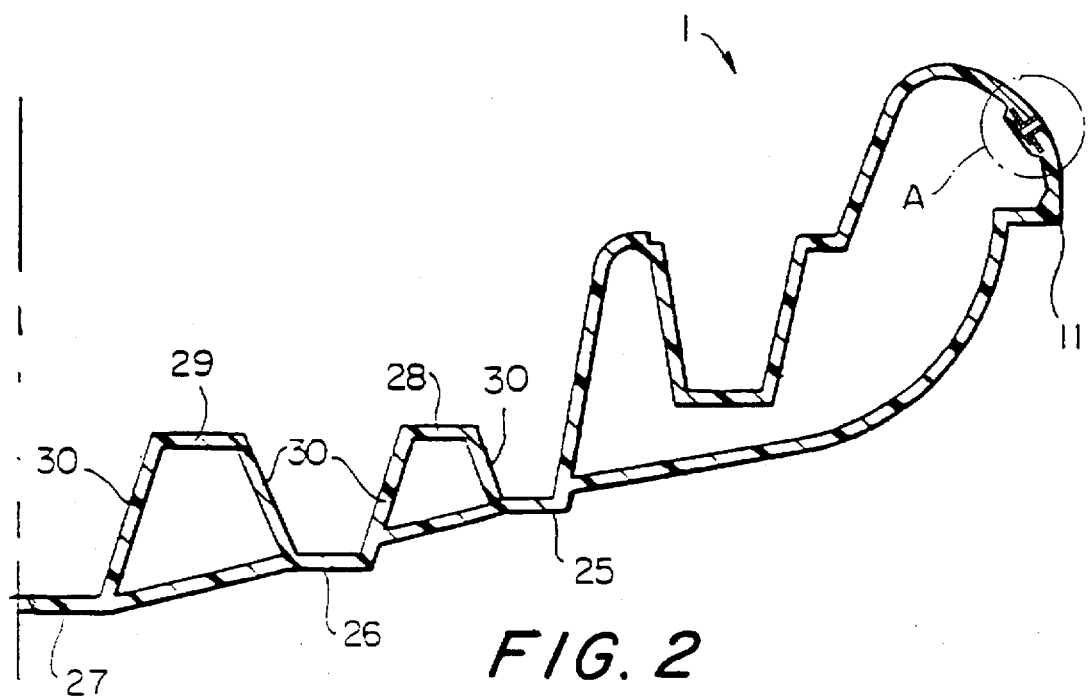
FIG. 2 is a cross sectional view corresponding to a half section at an intermediate section of the moulded boat hull, as shown by arrows 2—2.
Figure 5:
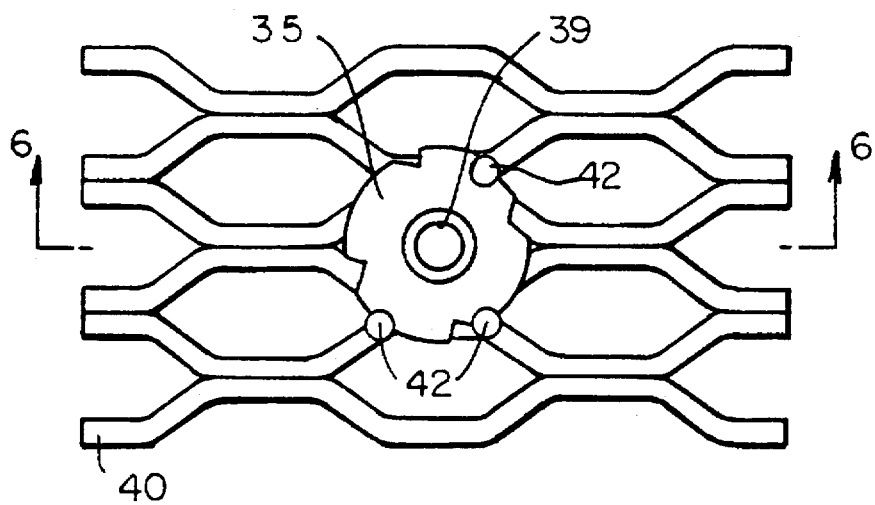
FIG. 5 is a top view of the threaded insert, mesh reinforcement assembly prior to insertion within the mould for forming the boat hull.
Figure 6:
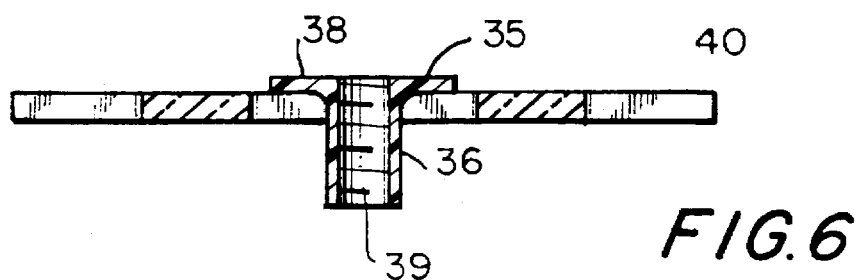
FIG. 6 is a front view of FIG. 5.
Figure 7:
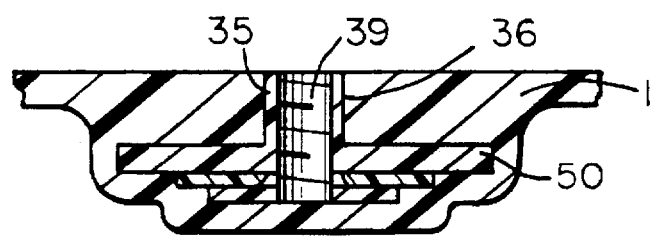
FIGS. 7–10, are of an alternative embodiment of the present invention, and correspond generally to FIGS. 3–6.
Figure 8:
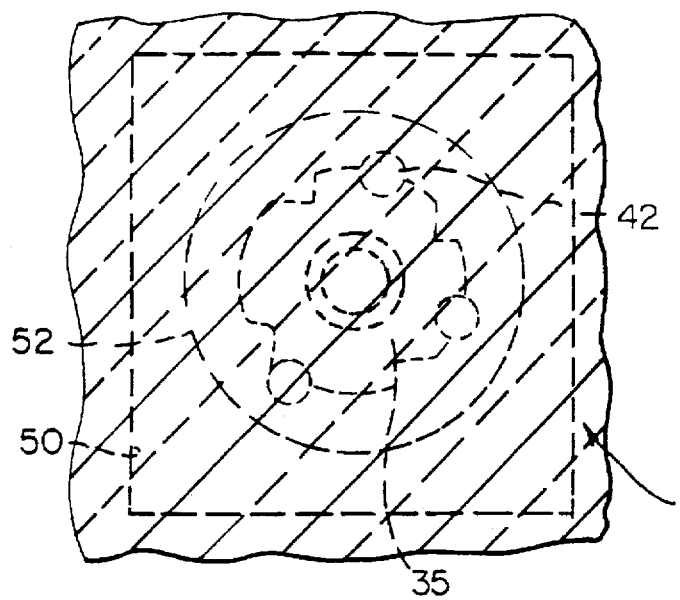
Figure 9:
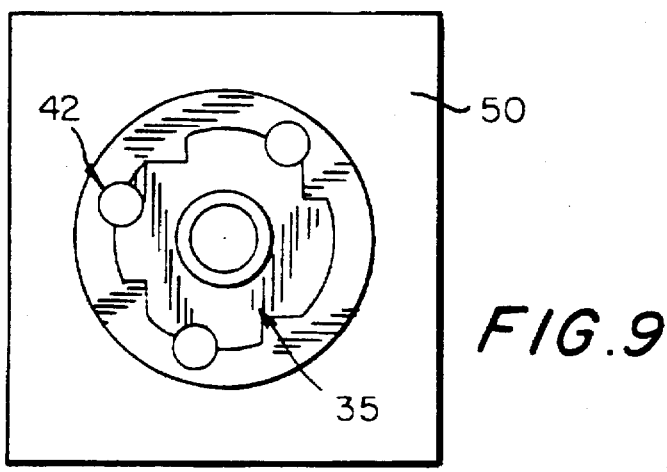
Figure 10:
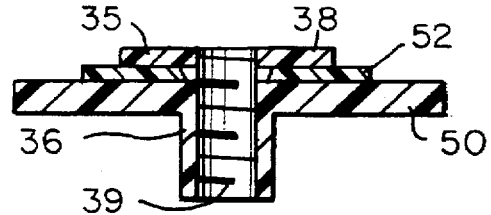

The hull 1 is preferably formed by means of a rotary shell mould with complementary inner and outer shell moulds (as shown in U.S. Pat. No. 5,458,844) forming the boat hull unit as shown in FIG. 2, which is peripherally joined at 11. Longitudinal stiffening members are advantageously provided which have lower faces 25, 26 and 27, upper flanges 28, 29 and intermediate webs 30. The stiffening member provide a series of longitudinally extending internal supports.

During moulding of the hull, the complementary inner and outer shell moulds are separated by a predetermined amount and a polymer moulding powder poured in the space between mechanism (not shown). The moulding powder may typically be Dupont 8405 polyethylene, although other polymer moulding powders may be used. The assembled mould filled with the moulding powder is then heated by a suitable means, such as by a gas fired oven into which the assembled mould may be placed, to a predetermined temperature, and is rotated and tilted according to a predetermined program cycle, and the complementary moulds moved towards each other. This ensures that the powder contained within the assembled mould flows over the entire opposed surfaces of the inner and outer shell moulds and melts to form a skin of a predetermined thickness. During this process the mould plastic is still in a soft state. Plastic at the opposed peripheral mould surfaces will be squeezed towards the interior of the mould so that a smooth peripheral joint of a predetermined thickness will be formed at 11.

Also at the time of bringing the moulds together, adjacent internal surfaces of the plastic mould material come together so that the plastic mould material is squeezed together in its soft state, thereby forming a homogeneous connection as shown at chine 25, strake 26 and keel portion 27 in FIG. 2. Advantageously an increased thickness of material is provided at 25, 26, and 27. The mould assembly is then allowed to cool and harden after which the mould parts are separated, leaving the completed hull 1 accessible for removal from the mould. A transverse panel (not shown) may be structurally fixed to the flanges 28 and 29, spanning across both sides of the center line, as is the subject of Ser. No. 08/561,418 of Nov. 21, 1995.

Associated boat components will be connected to the hull at several locations, such as the bow and stern eyes 10 of FIG. 1. It is naturally understood that several other connection locations will be provided within the hull with two such locations 10 being shown for illustrative purposes. Such connections during boat utilization tend to create localized regions of increased forces. If the hull is not suitably strengthened at such regions, or such forces dissipated over an increased area, such localized regions of increased force can create stresses, which over time will tend to damage the boat hull.

In accordance with the present invention, the stem and bow eyes 10, as well as other similar components which must be provided on the hull for connection to other boat components, are attached to threaded inserts integrally moulded to the hull structure during the afore described moulding process. FIGS. 3–6 show a preferred embodiment for providing such threaded inserts within the bow 1. Each such insert includes an internally threaded T-nut 35 having a shank portion 36, head 38 and internal thread 39. The internal thread 39 is of a suitable gauge to receive the conventional eye connector or other component (e.g. cleat) which is to be attached to the bow 1 at the desired location. The insert member 35 is first connected to a planar reinforcement member 40, which in the embodiment shown in FIGS. 3–6 is stainless steel mesh. Member 40 may typically be 14 gauge wire with the mesh constituting approximately 20% of the surface area. The insert 35 is connected to the mesh member 40 at welds 42.

Planar member 40 may typically be approximately 1.5 inches wide and 2.75 inches long. Naturally, alternative sizes may be utilized dependent upon the particular boat size, moulding material, and magnitude of anticipated force at the threaded insert location. Further, different size planar members may be used at different locations of the boat hull, dependent upon variations of the anticipated localized forces.

Figure 3:
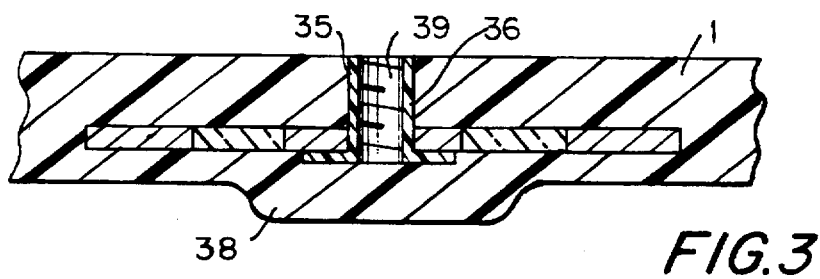
FIG. 3 is an enlargement of the region shown by the circled area A in FIG. 2.
Figure 4:
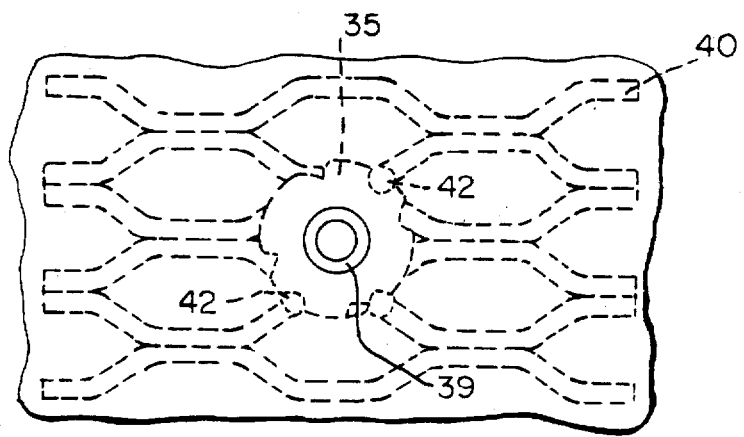
FIG. 4 is a top view of FIG. 3.

During the moulding process, apertures will be placed within the hull mould at those locations which are intended to receive the threaded insert 35. For the bow and stem eyes 10, such apertures will be placed within the outer, or hull mould. A bolt member (not shown) will then extend through the aperture within the, hull mould, and into the threaded insert for appropriately positioning the assembly of insert 35 and mesh member 40 at its intended location within the finished moulded product. This will locate and retain members 35 and 40 during the moulding process. After the rotational moulding process is completed, and the boat hull has cooled and solidified, the bolt member which temporarily retains the threaded insert assembly 35–40 in place is removed. This results in the assembly of members 35 and 40 being integrally moulded into the plastic material of the hull 1 as shown in FIG. 3.

The utilization of the planar member 40 serves to dissipate the forces at the threaded insert over a greater region of the boat hull, thereby avoiding the disadvantageous points of high localized stress.

Reference is now made to FIGS. 7–10 which show a modified embodiment, and in which those components corresponding to those of FIGS. 3–7 are similarly numbered. Instead of the mesh insert 50 shown in FIGS. 3–6, a solid stainless steel backing plate 50 is provided, which is separated from the head 38 of T-nut 35 by spacer member 52 typically formed of stainess steel. The planar member 50 may typically be 1.5 inches by 1.5 inches, and would be utilized, in contrast to planar member 40, where a lesser magnitude of force is anticipated, and/or the force can otherwise be safely dissipated over a smaller area. It should naturally be understood that a combination of the arrangements shown in FIGS. 3–6 and 7–10 may be used within a single boat construction, dependent upon the anticipated forces at the individual locations.

Accordingly, the present invention provides an arrangement for integrally reinforcing locations along the moulded boat hull in a manner avoiding highly localized stress points. This is achieved by integrally moulding a threaded insert within the hull, in conjunction with a force dissipating member.

Accordingly, it should be understood that although the present invention has been described in conjunction with specific embodiments, modifications and additions may be made thereto without departing from the scope of the present invention as defined in the appended claims.

What is claimed is:

1. In an integrally moulded plastic boat hull structure, comprising:
    opposed inner and outer shells which are integrally joined around peripheral portions thereof and which are also integrally joined at adjacent regions within said periphery by interior stiffening means including a plurality of spaced stiffening members integrally joined to and extending between said inner shell and outer shell, to form an integral unitary hull with hollow areas between said inner and outer shells, bounded by said spaced stiffening members;
    each of said shells including interior and exterior surfaces;
    a plurality of fastening locations for securing associated components to at least one of said shells;
    at least some of said fastening locations including a threaded insert integrally moulded into the plastic material of at least one of said shells, and including a threaded opening at the exterior surface of said shell;
    a planar force dissipating member integrally moulded into, and located between the interior and exterior surfaces of said shell at said fastening location;
    said threaded insert extending through an opening in said force dissipating member and secured thereto;
    such that localized forces developed at said fastening location are transferred away from the moulded shell attachment of said threaded insert to its immediately surrounding plastic material, to create an enlarged force dissipation region within said shell.

2. In an integrally moulded plastic boat hull structure according to claim 1, wherein:
    said force dissipating member is a planar member having an area significantly greater than the cross section of said threaded insert.

3. In an integrally moulded plastic boat hull structure according to claim 2, wherein:
    said force dissipating member has a rectangular area, and a central opening;
    said threaded insert being a T-nut having a head portion and a shank portion;
    said shank portion extending through said central opening; and
    said head portion secured to the circumference area of said force dissipating member about said central opening.

4. In an integrally moulded plastic boat hull structure according to claim 3, wherein:
    said force dissipating member is formed of metal, and
    said head portion is welded to said circumference area.

5. In an integrally moulded plastic boat hull structure according to claim 4, wherein:
    said force dissipating member is formed of metallic mesh.

6. In an integrally moulded plastic boat hull structure according to claim 4, wherein:
    said force dissipating material is formed of steel mesh.

7. In an integrally moulded plastic boat hull structure according to claim 4, wherein:
    said force dissipating member being formed of solid planar sheet material.

8. In an integrally moulded plastic boat hull structure according to claim 3, further including a spacer member between said head portion and said circumferential area of said force dissipating member.

9. In an integrally moulded plastic boat hull structure according to claim 1, wherein:
    said force dissipating member is formed of metal.

10. In an integrally moulded plastic boat hull structure according to claim 1, wherein:
    said force dissipating member is formed of metallic mesh.

11. In an integrally moulded plastic boat hull structure according to claim 1, wherein:
    said force dissipating material is formed of steel mesh.

12. In an integrally moulded plastic boat hull structure according to claim 1, including a fastening location facing a hollow area between said inner and outer shells.

13. In an integrally moulded plastic boat hull structure according to claim 1, including a fastening location within said inner shell.

14. In an integrally moulded plastic boat hull structure according to claim 13, wherein an inner shell fastening location faces a hollow area between said inner and outer shells.

* * * * *